Jan. 8, 1963 L. W. SHORT Re. 25,319

ABRADING ELEMENT INSET BIT HAVING IMPROVED CIRCULATING CHARACTERISTICS

Original Filed March 8, 1957

Lot William Short

INVENTOR.

BY Wayland D. Keith

HIS AGENT.

United States Patent Office

Re. 25,319
Reissued Jan. 8, 1963

25,319

ABRADING ELEMENT INSET BIT HAVING IMPROVED CIRCULATING CHARACTERISTICS

Lot William Short, Dallas, Tex., assignor to Tri-Dia, Inc., a corporation of Texas Original No. 2,990,897, dated July 4, 1961, Ser. No. 644,893, Mar. 8, 1957. Application for reissue Nov. 10, 1961, Ser. No. 152,714
24 Claims. (Cl. 175—330)

Matter enclosed in heavy brackets [ ] appears in the original patent but forms no part of this reissue specification; matter printed in italics indicates the additions made by reissue.

This invention relates to rotary bits for drilling bore holes in earth formations, and more particularly to a drill bit utilizing hard, abrading elements, such as diamonds or the like, for performing the cutting or abrading action on the earth formations. With more particularity, this invention is directed to a drill bit which makes the greatest use of the abrading elements, such as diamonds, so as to obtain the maximum cutting efficiency with the minimum of wear and decomposition of the abrading elements, and the material bonding the abrading elements to the bit body.

Various drill bits embodying diamond insets, or other hard abrading elements, have been proposed heretofore, but these, for the most part, were not designed to give the correct circulation of a coolant to the face of the bit so that each and every abrading element, such as a diamond, was properly cooled during the abrading action, [and which was,] *while said coolant was* at the same time continuously cleansing the abrading elements and the area surrounding same of the particles resulting from the abrading action on the formation. These particles are in the form of fine powder or minute formation particles. The constant cleansing of the abrading elements and the area surrounding them, enables the abrading elements, such as diamonds, to contact directly the formation on the bottom and the adjacent sides of the bore hole, which makes possible rapid cutting action by the abrading elements.

Furthermore, the abrading type bits which have been in use heretofore, were [genarlly] *generally* of a character that were substantially of the same diameter as the bore hole, and, as the abrading elements dislodged the formation from the bottom of the bore hole, the drill bit, being of such construction, further abraded the loose material into finely comminuted powder, which would considerably retard the drilling, in that the comminuted material is not readily dispelled, because the drilling fluid is not readily forced through the interstices around the abrading elements between the lateral passages on the lower end of the bit body, thereby preventing full contact of the abrading elements with the uncut formation, thereby reducing the effective cutting action of the abrading elements.

In the present invention, the drill bit comprises a body portion having a threaded cylindrical shank, which threaded shank portion usually has a tapered tool joint thread, the threads of which may either be male or female, in accordance with the particular string of the drill stem on which the bit is to be used. The body portion of the present bit is enlarged and preferably has three flattened facets symmetrically spaced around the periphery thereof, so as to present vertically arranged channels between each flattened side portion or facet and the wall of the bore hole, when the bit is in the bore of a well. The bit, in general, presents a design of triangular shape, when viewed from the bottom, with each of the adjacent facets being connected to an arcuate face of substantially the same curvature as the circumference of the hole it will cut. The bottom of the bit is a shape to present a center apical portion to aid in centering the bit, and an annular rounded bottom face portion which blends into tangential continuity with the cylindrical side portions and with the apical portion. A bit of this construction enables the abraded particles to be readily washed from the lower portion of the bore hole, which particles are disposed of by the circulation of the drilling fluid in the bore hole in the conventional manner.

The body of the bit has the cylindrical segment portions thereof positioned to lie transversely opposite the respective flattened portions, and to have a common axis. The diameter described by the cylindrical segment portions about said common axis is greater than any transverse distance taken on a plane through the bit body, which plane is perpendicular to the axis of the cylindrical segments. The lower end of the drill bit has a substantially annular, convexly contoured face covering the greater portion thereof, which face has primary and lateral passages formed therein for supplying coolant, such as water, drilling mud, or the like, to the drilling face of the bit, which passages are constructed in such manner as to permit the fluid to be discharged along the face of the bit in sufficient volume to thoroughly cool the abrading elements, such as diamonds, which fluid will be discharged at a pressure and velocity sufficient to erode or cut the formation by the action thereof, which greatly expedites the removal of the loosened formation, thereby expediting the progress of the bit. This eroding or cutting action by the fluid presents an advantage over other bits using similar abrading elements.

The present bit has a slot formed in one of the flattened sides, which slot connects with the conical recess for discharging abraded and crushed formation particles upwardly and outwardly therefrom.

[A fluid discharge opening directs fluid from the axial opening thereof to a point approximately mediate the] *A passage from the hollow shank directs drilling fluid through the bit body to a point approximately on the crown of the lower* annular convex drilling face, from which lateral water courses lead, so as to direct fluid into these lateral courses and therefrom into branch water courses in such manner that pressure is maintained on each of the branch courses sufficiently high to loosen and wash away all of the formation particles being cut, without the necessity of recutting or grinding these particles into fine powder.

An object of this invention is to provide a bit of the character which utilizes diamonds or other hard abrading elements, which diamonds are set along the contact face and sides of the bit, so as to obtain the maximum cutting or abrading functions with a minimum of wear on the abrading elements and on the bonding elements therefor.

Another object of the invention is to provide a conduit system for fluid circulation which will maintain a high pressure on the coolant fluid which is directed, at high velocity, to every abrading portion of the bit body.

Still another object of this invention resides in the provision of a drill bit wherein any transverse distance through the bit, which lies in a plane perpendicular to the axis of the bit, is less than the size of the bore hole which it will cut.

A further object of the invention is to provide a drill bit having an axial conical recess in the lower end thereof, and a slot formed in the body, which slot connects the conical recess with the exterior of the bit body, the inner conical face of the conical recess is studded with abrading elements, which enables the abrading and crushing of the formation, which formation is discharged outward through said slot.

A still further object of the invention is to provide a rotary drill bit of the abrading type, which has lateral fluid discharge passages formed in the face thereof, wherein the lateral passages are so designed as to discharge the fluid under pressure in such manner that the fluid discharged will be at a velocity and pressure which erodes or cuts the formation and washes the abraded formation free therefrom, so as to keep the interstices between the abrading elements free of formation particles.

Yet another object of the invention is to provide an abrading drilling bit, the pressure on and the lineal speed of the cutting portions of which, can be controlled to give maximum efficiency.

A still further object of the invention is to provide a drill bit wherein the drilling fluid will be directed over the face of the abrading surface in a curved course, thereby obtaining maximum eroding effect from the velocity and pressure thereof.

A yet further object of the invention is to provide a course for the drilling fluid, which course is so designed as to provide free flow of coolant to the portions of the bit which are operating under great pressure, thereby dissipating the heat created thereby.

Still another object of the invention is to provide a bit construction whereby the cut and eroded formation will pass directly into the up-stream of drilling fluid, without having to be reground by passing over the cutting surface, and which will allow the material in the bottom of the hole to be washed up without wearing the cutting elements by re-griding such material.

Yet another object of the invention is to provide a drill bit construction whereby the maximum amount of cooling fluid is directed under pressure to the abrading surfaces that contact the formation.

Another object of the invention is to provide a polygonal bit body, preferably triangular in shape, with rounded or modified corners, thereby eliminating hydrostatic pressure differential when going into or coming out of the hole, the non-circular shape of which bit also eliminates the sticking thereof in certain formations.

A general object of this invention is to provide a drill bit, the construction of which provides a maximum use period for the abrading elements, by providing coolant in greatest amounts where the greatest abrading action takes place, and by protecting the abrading elements and the matrix thereof from regrinding cut formation before it can be washed from the bore hole by the drilling fluid.

Another object of the invention is to provide an abrading type drill bit, wherein the wall reaming contact portions are relatively narrow compared to the intermediate non-contact portions.

With the foregoing objects in mind, and others which will become manifest as the description proceeds, reference is to be had to the accompanying drawings, in which like reference characters designate like parts in the several views thereof, in which.

Figure 1:
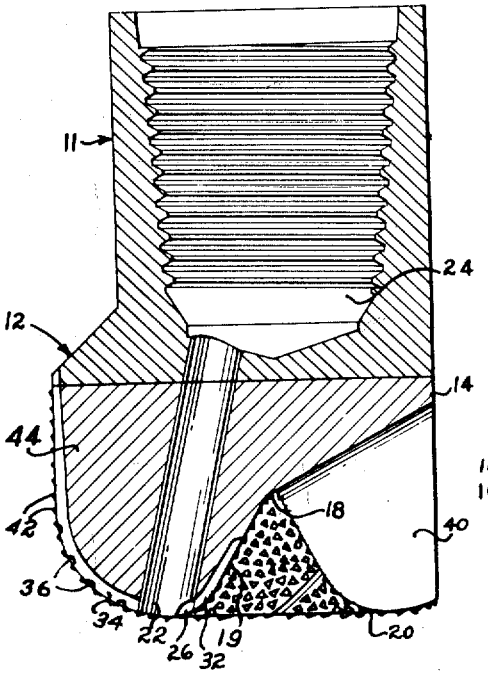
FIG. 1 is a longitudinal, sectional view taken through the axis of the bit, and showing the fluid discharge course, the center apical portion, and the outwardly extending slot in the bit body.
Figure 2:
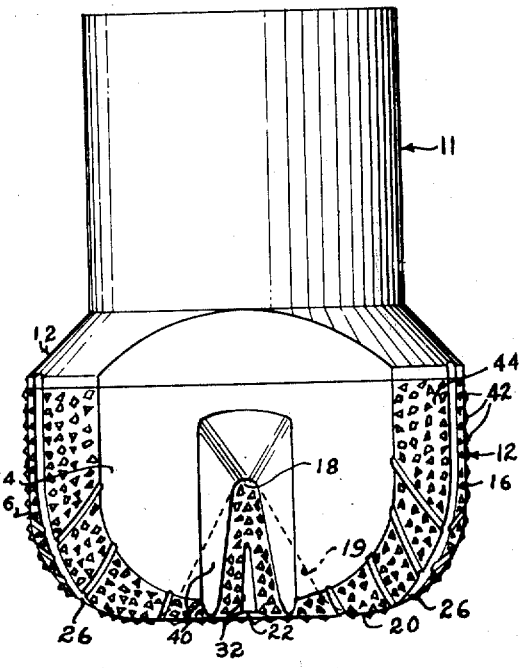
FIG. 2 is a side elevational view of the drilling bit, showing one of the flattened facet portions thereof.
Figure 3:
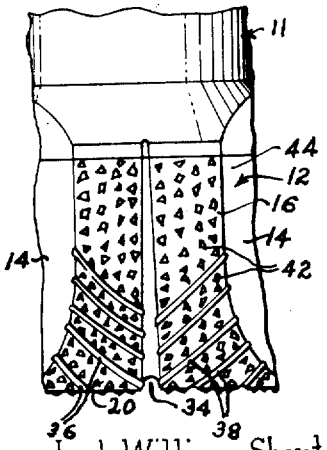
FIG. 3 is a fragmentary elevational view of a cylindrical portion of the bit body opposite one of the flattened facets thereof.
Figure 4:
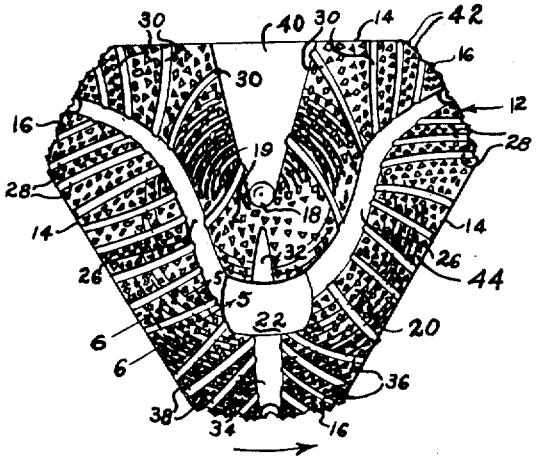
FIG. 4 is a bottom plan view of the bit body, showing the water courses therein and the general configuration of the bit.
Figure 5:
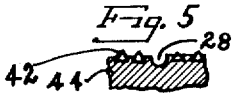
FIG. 5 is a sectional view taken on the line 5—5 of FIG. 4, looking in the direction indicated by the arrows.
Figure 6:
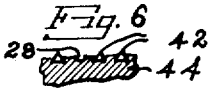
FIG. 6 is a sectional view taken on the line 6—6 of FIG. 4, looking in the direction indicated by the arrows.

The drill bit, as shown herein, is of the character used on the lower end of rotary drill stem in the drilling of deep wells and the like, and particularly the drilling of hard formation by the rotary drilling method, wherein the drill stem (not shown) is rotated by a rotary table (not shown), and wherein the drill stem is usually raised and lowered from or into the bore hole by the draw works (not shown) of the drilling rig, and wherein drilling fluid, prepared from bentonite clays and the like, is circulated down through the drill stem and discharged through the lower end of the drill bit, so as to cool the abrading elements on the bit, and to cleanse the bottom portion of the bore hole to free it of abraded particles of formation, as is well understood in the art of rotary well drilling.

With more specific reference to the drawings, the numeral 11 designates generally a hollow, threaded shank, which shank has an enlarged body portion 12 formed integral therewith. The body portion 12 is generally of triangular shape, having three flattened portions or facets 14 on the sides thereof to form discharge passages, as will be more fully brought out hereinafter. A cylindrical segment 16 connects adjacent facet portions 14, which cylindrical segments form lateral gauge cutting portions or reaming faces which are co-axial with an apical portion 18, so as the bit rotates, cutting action is had simultaneously by the cylindrical portions 16, the lower face portion 20 of the bit, as well as by the apical portion 18 and conical portion 19 thereof.

As will best be seen in FIG. 1, the face portion 20 of the bit is a convex, substantially annular cutting face with a discharge passage 22 formed therein, which passage leads from the hollow neck portion 24 of the shank 11 and terminates substantially on the crown of the annular convex face 20. Grooves 26, formed in the abrading faces of the bit, form primary fluid discharge passages which lead from the fluid discharge passage 22, along the top of the crown or slightly toward the axis of the bit body, which passages 26 have branch or lateral passages 28 and 30 leading therefrom, with the lateral passages 28 leading outward from the primary passages 26 and the lateral passages 30 leading inward from the primary passages 26. A passage 32 leads inward into the conical recess 19, from the fluid discharge passage 22. A passage 34 leads from the passage 22 and has branch passages 36 and 38 extending therefrom. The primary passage 34 which leads outward from the fluid discharge passage 22, extends upward along the side of one of the cylindrical segments 16, and has lateral passages 36 and 38 leading therefrom. Each of the [lateral] *primary* passages 26, 26 and 34 has the cross-sectional area thereof progressively reduced an amount approximating the area of the fluid discharge [sources] *courses*, such as the areas of passages 28, 30, 36 and 38.

The primary passages 26 extend along the respective cylindrical segments 16 of the bit body to a point near the upper end thereof, with the number of lateral passages on the leading side of the cylindrical portion of the bit exceeding the number of passages on the trailing side of the cylindrical segment, so that the fluid discharged will serve to cool the cutting elements of the bit, and to wash away the abraded particles from between the abrading elements, which fluid will flow, in a sheet at constant velocity over the entire face of the bit, and around and between the abrading elements on the abrading faces of the cylindrical segments of the bit. The abrading action of the abrading elements against the formation develops a great deal of heat, since the pressure necessary to cut the formation is great, therefore, the water courses are so arranged and designed as to produce a pressure drop across the bit face so as to force the greatest amount of drilling fluid over the abrading segments and the abrading elements thereon to cool them and to wash away cuttings.

In the present device, the passages for the drilling fluid are so constructed and arranged as to direct the drilling fluid to the surfaces in which the abrading elements are mounted, in such manner as to be proportionate to the area of the bit face.

It is to be pointed out that the size and depth of the primary discharge passages 26 and 34, as well as that of the lateral passages 28, 30, 36 and 38, are calculated with mathematical exactness, as to the amount of fluid the respective passages will carry at a given volume rate at a given pressure and at a predetermined velocity. The primary lateral passages 26 and 34 are each reduced in cross-sectional area, after each lateral passage [leds] *leads* off, equal to the area of the lead off lateral, so as to cause the flow of fluid to be directed uniformly at high pressure and high velocity therethrough and through the lateral passages 28, 30, 36 and 38, so that the drilling fluid will discharge at a pressure to give an eroding or cutting action on the formation, due to the velocity thereof. Such action of the drilling fluid on the formation will immediately dislodge and wash away any abraded particles into one of the channels formed between a facet 14 and the bore hole of the well, or such material will be discharged through slotted opening 40, which opening 40 is formed in the lower portion of the body 12 to interconnect the conical recess 19 along the entire side thereof and one of the facets 14 on the exterior of the bit body, as will best be seen in FIG. 1. The slotted opening 40 is formed in one of the flattened sides 14 of the body 12 and extends through one side of the convex lower portion 20, thus open communication from the conical portion 19 and one of the facets 14 is established.

The bit body 12 is preferably constructed of high quality steel, which body 12 is fitted into a mold cavity wherein the abrading elements, such as diamonds, have been prepared. The abrading elements 42, which are to be bonded to the bit body 12, are pre-set in a mold cavity, in a manner well understood in the art of molding abrading or diamond set bits of this character, and with the abrading elements, such as diamonds, 42 thus set or arranged in the mold cavity, a sintered metal or matrix 44, which is to be the bonding element between the abrading elements and the bit body, is formed in the mold cavity in such manner as to receive the enlarged body portion 12 of the bit. Then high pressure and relatively high heat are applied to cause the bonding or fusion of the sintered metal with the bit body, which sintered metal has the abrading elements protruding therefrom, but firmly anchored therein, in such manner that the abrading elements form abrading lands between the various lateral fluid passages of the bit body, so that the entire abrading portion of the bit, including the apical portion 18 and the annular convex portion 20 thereof, as well as the cylindrical segments 16, are set with the abrading elements 42.

The abrading elements 42, may be of a size and shape and set in such pattern, as to meet the individual requirements of the bit, for instance, some formations require sharp edged abrading elements, such as diamonds, for best results, while other formations may require a round nosed abrading element or diamond for best results. However, in general, since the peripheral portion of the bit is rotated at its maximum cutting efficiency for the abrading elements, the center or apical portion is rotating about an axis at zero linear speed, therefore, as the abrading elements get progressively closer to the axis of rotation, the cutting action diminishes and a crushing action gradually takes place toward the center-most abrading elements. With the center-most abrading elements exerting primarily a crushing action on the formation, rather than a cutting action, the conical portion 19 and the apical portion 18 of the bit, which are inset with abrading elements, such as diamonds, will withstand extreme crushing pressure and must be cooled accordingly, as great heat is generated during the drilling, and the abraded particles of formation must be washed from the interstices between the abrading elements and from between the abrading faces and the formation contact surface, by the drilling fluid being circulated through the various passages and over the abrading faces of the bit body.

The fluid discharge passages are so designed that the fluid which flows from passage 22 through the primary lateral passages 26 and 34 maintains a constant fluid velocity therethrough. This is brought about by reducing the cross-sectional area of the lateral passages in an amount proportionate to the amount of fluid drawn off by the secondary lateral passages 28, 30, 36 and 38 and by the discharge of fluid from the interstices formed between the abrading elements, therefore, a constant velocity is maintained on the fluid throughout the entire abrading surface of the bit. The fluid velocity required for best performance, is one that approaches or even reaches a slight degree of fluid erosion on the bit matrix. When the velocity of the fluid has attained a force to give the desired effect, the formation will be cut to the maximum degree of efficiency.

By having the lateral passages constructed as described herein, with the composite cross-sectional area being less than the cross sectional area of the discharge passage 22, and with the primary passages 26, 32 and 34 constricted progressively toward the respective ends thereof, a full flow of drilling fluid is always maintained at high velocity in and through the lateral passages 28, 30, 36 and 38, to give the optimum of efficiency in operation.

OPERATION OF INVENTION

With the threaded shank 11 screwed onto the lower end of a drill stem and lowered into contact relation with the formation to be drilled, which is usually the bottom of a well, the softer formation having been drilled with a three-cone rock bit, and with the annular convex cutting face 20 in contact relation with the formation at the bottom of the well, a drilling fluid, which may be water or drilling mud depending on the character of the particular formation that has been previously cut, or is to be cut, is circulated down through the drill stem with the drilling fluid discharging into the hollow portion 24 of the shank 11, whereupon, the drilling fluid is directed through fluid discharge passage 22 into the primary fluid passages 26, 32 and 34, which primary passages are constricted near the terminal ends thereof. Lateral passages 28, 30, 36 and 38, of smaller cross sectional area than the primary passages, lead therefrom so as to distribute the drilling fluid and coolant uniformly over the area of the abrading elements 42, which act on the formation. The primary fluid passages 26 and 34 also distribute the drilling fluid along the reaming faces 16 of the bit in such manner as to supply a greater amount of fluid to the leading edge of each cylindrical reaming segment 16.

The conical recess portion 19 will form an upstanding cone in the formation, as the annular abrading face of the bit removes cut formation from the area surrounding the cone. The weight of the drill stem exerted on the formation will cause a crushing action by the abrading elements on the formation cone, as the bit is rotated, whereupon, the crushed formation is discharged outwardly and upwardly through slot 40 in relatively large pieces, without this portion of the formation having to be passed outward beneath the lower face of the drill bit to be reground into fine powder-like particles. Simultaneously with the crushing action exerted on the up-standing formation cone, by the abrading elements acting thereon by the weight of the drill stem, a cutting action is present in varying degrees from the apical portion 18 to the peripheral portion 16, with the degree of cutting action increasing progressively toward the periphery of the bit, where the greatest cutting action at its greatest efficiency is had.

With the formation thus cut, the drilling fluid, which is discharged at high pressure and velocity at the bottom of the well, causes the formation to be washed upward exteriorly of the drill stem within the bore hole of the well, in a manner well understood in the art of rotary drilling.

Having thus clearly shown and described the invention, what is claimed as new and desired to secure by Letters Patent is:

1. A drill bit comprising a bit body having a bit head of triangular shape having modified rounded corners, with an endwise cutting portion and a lateral gauge cutting portion, a recess extending upwardly into the lower end of said body to a point above said endwise cutting portion and disposed coaxially therewith to receive the formation remaining at the center of the hole being drilled, means exposed to the interior of said recess above the lower end thereof for applying a lateral force to upstanding formation in said recess to break the same off, a passageway in the surface of said bit body and extending from an entire side of said recess to a point exteriorly of and above the bit head so that said formation formed in said recess and then broken off can pass through said passageway to a point above the bit.

2. A drill bit comprising a bit body having a bit head of triangular shape having modified rounded corners, with an endwise cutting portion and a lateral gauge cutting portion, a recess having upstanding walls extending upwardly into the lower end of the body to a point above said endwise cutting portion, said recess being disposed coaxially with said body to receive the upstanding formation at the center of the hole being drilled, a passageway extending from said recess to a point exteriorly of and above the bit body and including a groove in the surface of the bit body which extends laterally from an entire side of said recess to a point exteriorly of the bit body above the gauge cutting surfaces thereof so that the formation remaining in said recess and then broken off can pass through said groove to a point above the bit, and means carried by the bit body and exposed to the interior of said recess for applying lateral force to said upstanding formation in said recess to break same off and for flushing such broken off formation laterally through the groove and then upward from the bit.

3. A drill bit comprising a hollow, threaded member with an enlarged bit body thereon, said bit body having three contact reaming faces, said body having a non-contact face formed between adjacent reaming faces, said reaming faces being cylindrical segments having a common axis, the lower part of said reaming faces converging into a rounded lower face, said reaming faces and said rounded lower face being inset with abrading elements, said body having a longitudinal opening formed therethrough which opening is in communication with said hollow member, said bit body having lateral grooved passages formed in the reaming faces thereof and in said rounded lower face, which passages are in communication with said longitudinal opening in said bit body, said bit body having an apical recess formed in the lower face thereof, said bit body having a substantially radial, grooved passage formed therein and extending laterally from the apex of said apical recess upward through said bit body to the exterior thereof on one of said non-contact faces.

4. A drill bit comprising a hollow threaded member with an enlarged bit body thereon, which bit body has three contact reaming faces thereon, a chordal, non-contact face adjacent each said reaming face, the lower part of said reaming faces converging into a rounded lower face, said reaming faces and said lower face being inset with abrading elements, said bit body having a longitudinal passage formed therethrough which is in communication with said hollow, threaded member at one end, the other end of said longitudinal passage terminating in said rounded lower face to form an outlet opening for said passage, which bit body has an apical recess formed in the lower face thereof, said bit body having a radial passage formed therein, which passage extends from said apical recess to the exterior of one of said chordal, non-contact faces, said radial passage being so formed as to be greater in cross-sectional area at the outer end thereof, which terminates in said non-contact face, than the portion thereof which joins said apical recess, and which radial passage is in communication with said apical recess along the entire slant height thereof.

5. A drill bit for drilling a bore hole in the earth formation, which drill bit comprises a hollow, threaded member having an enlarged bit body thereon, which bit body has a central recess formed in the lower side thereof, said bit body having three contact reaming faces thereon, a non-contact face between adjacent reaming faces, the lower portions of said reaming faces converging into a rounded lower face, which rounded lower face is approximately annular, said reaming faces and said rounded lower face being inset with abrading elements, said bit body having a non-axial, longitudinally disposed hole formed therethrough, one end of which hole is in communication with said hollow, threaded member, the other end of said hole terminating in said rounded lower face of said approximately annular portion of said bit body, said bit body having a lateral grooved passage formed in said lower face, which lateral grooved passage extends upwardly and outwardly from an entire side of said central recess for passing broken formation from said recess, and said bit body having further passages formed therein on the exterior abrading surface thereof, said non-axial, longitudinally disposed hole being connected in fluid communication with said further passages.

6. A drill bit for drilling a bore hole in the earth formation, which drill bit comprises a bit body having a recess formed in an end thereof, abrading elements inset within the portion of said bit body which forms said recess to form an abrading face, threaded means on the upper end of said bit body in axial alignment with said recess, said bit body having three cylindrical segmental faces on the periphery thereof, which cylindrical segmental faces are coaxial with said recess, each said cylindrical segmental faces being inset with abrading elements to form abrading faces, a non-contact face extending between adjacent edges of said cylindrical segmental faces, each of which non-contact faces is of greater width on the perimeter of said bit body than the width of the respective cylindrical segmental faces, the distance from the axis of said bit body to any point on any of said non-contact faces being less than the radius of the respective cylindrical segmental faces, said bit body having a lateral passage formed therein, which passage leads upwardly and radially outward from the entire side of said recess and terminates on one of said non-contact faces, said bit body being so contoured as to present a portion of an annular convex face partially around said recess, the surface of which convex face extends upward in tangential relation with said cylindrical segmental faces and to the surface of said recess, which annular convex face portion is inset with abrading elements to form an abrading surface, said bit body having a hole formed therethrough which hole has the terminal end thereof located on said partial annular convex face on the lower end of said bit body, said abrading surface and said segmental faces of said bit body having primary grooved passages formed therein which connect with and lead from the terminal end of said opening through said bit body, with certain of said primary grooved passages leading outwardly to the exterior of said cylindrical segmental faces and certain of said passages leading to the interior of said recess to connect in fluid communication with said lateral passage which leads upwardly and radially outward from said recess.

7. A drill bit for drilling a bore hole in the earth formation, which drill bit comprises a hollow threaded member, an enlarged bit body attached to the lower end of said hollow, threaded member, which bit body has three cylindrical reaming faces thereon, a non-contact face between adjacent reaming faces to form a bit body of triangular shape with modified rounded corners, said non-contact faces forming passages between said bit body and the wall of said bore hole to permit comparatively large pieces of cut formation to be passed upward therethrough, the lower portion of said reaming faces converging into a rounded, convex lower face, said bit body having a formation receiving recess formed coaxially therein, said reaming faces, said rounded, convex lower face, and said face within said recess being inset with abrading elements, a passage formed in said bit body, which passage extends from said formation receiving recess laterally upward and outward from an entire side of said recess to the exterior of said bit body, said bit body having a hole formed therethrough which extends from said hollow, threaded member to and terminating in said rounded convex lower face of said bit body, said reaming faces, said rounded convex lower face and said face within said recess of said bit body each having at least one lateral groove formed therein, and at least one of said grooves being in communication with said formation receiving recess so that upstanding formation formed within said formation receiving recess and broken off can pass through said passage to a point above said lower face of said bit body, and means carried by said bit body and exposed to the interior of said recess for applying lateral force to said upstanding formation in said recess to break off same and for flushing said broken formation laterally through said passage and then upward from said bit.

8. A drill bit comprising a hollow threaded member with an enlarged, modified triangular bit body attached thereto, said bit body having three non-contact, plane faces on the periphery thereof and three arcuate, contact, reaming, faces on the periphery of said body intermediate said non-contact, plane faces, said reaming faces each having the lower portion thereof converging to form a rounded lower face, said bit body having a longitudinal passage formed therethrough, one end of which is in communication with said hollow member and the other end terminating on said rounded lower face, said bit body having at least two lateral grooved passages formed therein, one of each lateral grooved passages being in fluid communication with said longitudinal passage, which lateral grooved passages extend over a portion of said rounded lower face and of said reaming faces, said bit body having further lateral grooved passages formed therein which further lateral grooved passages lead from said first mentioned lateral grooved passages, said reaming faces and said rounded lower face of said bit body each having a portion of the surface thereof studded with partially embedded abrading elements intermediate said lateral grooved passages.

9. A drill bit including a body having a substantially conical recess formed in one end thereof, abrading elements inset within the portion of said body which forms said recess to form an abrading face, means attachably securing said bit body to a stem so the axis of said conical recess is axial with said stem, said body having at least three cylindrical segmental faces on the periphery thereof, which cylindrical segmental faces are coaxial with said conical recess, abrading elements inset in said cylindrical segmental faces to form abrading faces, a non-contact face extending between adjacent segmental faces, the distance from the axis of said bit to any point on any of said non-contact faces being less than the radius of the respective cylindrical segmental faces, said bit body being so contoured as to present a portion of an annular convex face surrounding said conical recess, the surface of which face extends upward in tangential relation to said cylindrical segmental faces and to the surface of said conical recess, which annular convex face portion is inset with abrading elements to form an abrading face, said body having an opening formed therethrough, said opening having the terminal end thereof located in said annular convex face on the lower end of said bit body, said abrading faces of said bit body having primary grooved passages formed therein and connecting with and leading from the terminal end of said opening through said bit body, said abrading faces of said bit body having lateral grooves formed therein and extending outward from each side of at least two of said primary grooved passages so fluid discharged from said primary grooved passages will be distributed to the abrading faces of said bit body, which bit body is of general triangular shape, with the non-contact faces thereof connecting said cylindrical segmental faces to present plane faces on at least three sides of said bit body.

10. A drill bit as defined in claim 9, wherein any transverse dimension of said bit body perpendicular to the axis thereof, is less than the diameter of the hole said bit will drill.

11. A bit construction as defined in claim 9, wherein any transverse dimension of said bit body is less than the diameter of the hole which it will drill, so said bit will pass through a non-circular opening having a dimension less than the diameter which said bit will drill.

12. A drill bit for drilling a bore hole in the earth formation, which drill bit comprises a hollow, threaded member with an enlarged bit body thereon, which bit body has three contact reaming faces thereon, a non-contact face between adjacent reaming faces, the lower part of said reaming faces converging into a rounded lower face, said reaming faces and said rounded lower face being inset with abrading elements, said bit body having a non-axial, longitudinal hole formed therethrough, which hole is in communication with the hollow of said hollow member, said rounded lower face having said hole extending therethrough, said bit body having an apical recess formed axially therein and terminating in the rounded lower face thereof so as to define an approximately annular abrading face therearound, said bit body having at least two lateral grooved passages formed in said rounded lower face and in said reaming faces thereof, one end of each said grooved passages being in communication with said longitudinal hole in said bit body, said bit body having further grooved passages in said rounded lower face and in said reaming faces thereof, which further lateral grooved passages lead from and are in fluid communication with said first mentioned lateral grooved passages, said first mentioned lateral grooved passages being decreased in cross-sectional area progressively in the direction of discharge after each successive further lateral grooved passage leads therefrom.

13. A drill bit comprising a hollow, threaded member with an enlarged bit body thereon, which bit body has three contact reaming faces, said body having a non-contact face formed between adjacent reaming faces, the lower part of said reaming faces converging into a rounded lower face, said reaming faces and said rounded lower face being inset with abrading elements, said body having a longitudinal passage formed therethrough which passage is in communication with said hollow member, the lower end of said longitudinal passage terminating in said rounded lower face to form an outlet opening for said longitudinal passage, said bit body having lateral grooved passages formed in the reaming faces thereof and in said rounded lower face, which passages are in communication with said longitudinal passage formed in said bit body, said bit body having further lateral grooved passages formed therein which further grooved passages lead off from said first mentioned lateral grooved passages over the lower face of said bit body, with said first mentioned lateral grooved passages being reduced in cross-sectional area, in the direction of discharge, approximately the amount of the cross-sectional area of each second mentioned lateral grooved passage leading therefrom between each successive second mentioned lateral grooved passages.

14. A drill bit adapted to be attached to a drill stem, which drill bit includes a body having a substantially conical recess formed in an end thereof, abrading elements inset within the portion of said body which forms said recess to form an abrading face, means attachably securing said bit body to said drill stem so the axis of said conical recess is axial with said stem, said bit body having at least three cylindrical segmental faces on the periphery thereof, which segmental faces are coaxial with said conical recess, abrading elements inset in said cylindrical segmental faces to form abrading surfaces, a non-contact face extending between adjacent sides of said cylindrical segmental faces, each of which non-contact faces is of greater width on the perimeter of said bit body than the respective cylindrical segmental faces thereof, the distance from the axis to any point on any of said non-contact faces being less than the radius of said cylindrical segmental faces, said bit body being so contoured as to present a portion thereof as an annular convex face surrounding said conical recess, the surface of which face extends upward in tangential relation with said cylindrical segmental faces and to the surface of said conical recess, which annular convex face portion is inset with abrading elements to form an abrading surface, said body having an opening formed therethrough, said opening having the terminal end thereof located in said annular convex face of said bit body, said abrading surfaces of said bit body having primary grooved passages formed therein, which primary grooved passages connect with and lead from the terminal end of said opening in said body, said abrading surfaces of said bit body having lateral grooves formed therein, which lateral grooves extend outward from each side of at least two of said primary grooved passages so fluid discharged from said primary grooved passages will be distributed to the abrading surfaces of said bit body, which lateral grooved passages are of uniformly decreasing cross-sectional area from the opening in said bit body toward the respective terminal ends thereof.

15. A drill bit adapted to be attached to a drill stem, which drill bit includes a body having a substantially conical recess formed in one end thereof, abrading elements inset within the portion of said body which forms said recess to form an abrading surface, means attachably securing said bit body to said drill stem so the axis of said conical recess is axial with said drill stem, said body having three cylindrical segmental faces on the periphery thereof, which segmental faces are coaxial with said conical recess, abrading elements inset in said cylindrical segmental faces to form abrading surfaces, a non-contact face extending between adjacent sides of said cylindrical segmental faces, each of which non-contact faces is of greater width on the perimeter of said bit body than the respective cylindrical segmental faces thereof, the distance from the axis to any point on any of said non-contact faces being less than the radius of said cylindrical segmental faces, said bit body being so contoured as to present a portion thereof as an annular convex face surrounding said conical recess, the surface of which face extends upward in tangential relation with said cylindrical segmental faces and to the surface of said conical recess, which annular convex face portion is inset with abrading elements to form an abrading surface, said body having an opening formed therethrough, said opening having the terminal end thereof located in said annular convex face of said bit body, said abrading surfaces of said bit body having primary grooved passages formed therein, which primary grooved passages connect with and lead from the terminal end of said opening in said bit body, said abrading surfaces of said bit body having lateral grooves formed therein, which lateral grooves extend outward from each side of at least two of said primary grooved passages so fluid discharged from said primary grooved passages will be distributed to the abrading surfaces of said bit body, and said bit body having a notched opening formed therein, which opening extends upward and radially outward from the top of said conical recess in said bit body to the exterior of one of said non-contact faces for the discharge of relatively large pieces of formation directly therefrom into the upflow stream of drilling fluid.

16. A drill bit as defined in claim 15, wherein any transverse dimension of said bit body, perpendicular to the axis thereof, is less than the diameter of a circle having an axis common to and a curvature common to said cylindrical segmental faces.

17. A drill bit adapted to be attached to the lower end of a drill stem, as defined in claim 15, wherein said radially positioned notched opening in said bit body is increased in width and height toward the periphery of said bit body.

*18. A drill bit adapted to be attached to a drill stem for the drilling of holes in earth formations, said drill bit comprising a hollow shank, an enlarged bit body carried by said shank and having a generally triangular configuration defined by coaxial segmental cylindrical lateral reaming faces and by non-reaming lateral facets, there being three such non-reaming facets each of greater circumferential extent than any of said reaming faces with one such facet between and joining successive ones of said reaming faces and lying wholly within the cylindrical surface generated by said reaming surfaces, said drill bit having a rounded lower face and having a hole extending therethrough from said hollow shank, said lower face and said lateral reaming faces being set with abrading elements, said abrading elements being closely set over the said lower face and extending to the edges thereof joining said non-reaming lateral facets.*

*19. A drill bit for drilling holes in earth formations, comprising a hollow shank, an enlarged bit body extending from said shank and having a generally triangular configuration defined by rounded lateral reaming faces and non-reaming lateral facets, one such facet extending between each two rounded faces radially inwardly thereof for the full height of said bit body and being of greater width on the perimeter of said body than any of said rounded faces, the lower face of said bit body convexly and smoothly joining said rounded faces, said rounded faces and said lower face being set with abrasive elements and being provided with grooves some of which extend laterally over said lower face to terminate at said facets and others of which extend the full height of said rounded faces, there being a fluid passage from said shank through said bit body discharging through said lower face and in communication with some of said grooves for washing away abraded particles of the formation being drilled and for carrying such particles upwardly through the clearances provided between said facets and the wall of the hole being drilled, the abrasive elements on said lower face being closely set throughout the full extent thereof up to the edges defined by said lower face and said lateral facets.*

*20. A drill bit adapted to be attached to a drill stem for the drilling of holes in earth formations, said drill bit comprising a hollow threaded shank, and an enlarged bit body carried by said shank, said bit body having three co-axial segmental cylindrical lateral reaming faces and intermediate non-reaming facets, the surfaces of said facets being of greater width on the perimeter of said body than any of said reaming faces and lying wholly within the cylinder generated by said lateral reaming faces and extending longitudinally substantially the full height of said bit body to provide passages between facets and the wall of the hole being drilled, said drill bit having a rounded lower reaming face smoothly joining said lateral reaming faces, all of said reaming faces being set with abrading elements, there being a hole extending longitudinally through said bit body and opening through said lower face, and said lower face having a passage therein extending laterally from said hole opening to the outer periphery of said lower faces, the abrading elements on said lower face being closely set and continuing to the edges defined by said lower face and said non-reaming facets.*

*21. A drill bit comprising a hollow threaded member and an enlarged bit body thereon, said bit body being of*

*generally triangular configuration defined by three lateral contact reaming faces and intermediate non-contact facets, each of said facets being of greater circumferential extent than any of said reaming faces to afford when the bit is operating in a hole channels between such non-contact facets and the wall of said hole, said bit body having a rounded lower reaming face smoothly and convexly merging with said lateral reaming faces and all of said reaming faces being substantially covered with abrading elements, said bit body having a longitudinally extending opening formed therethrough providing flow communication from said hollow member through said lower face, the abrading elements on said lower reaming face being closely set and continuing to the edges defined by said lower face and said non-contact facets.*

*22. A drill bit comprising a hollow threaded member and an enlarged bit body thereon, said bit body being of generally triangular configuration defined by three lateral contact reaming faces and intermediate non-contact facets, each of said facets being of greater circumferential extent than any of said reaming faces to afford when the bit is operating in a hole channels between such non-contact facets and the wall of said hole, said bit body having a rounded lower reaming face smoothly and convexly merging with said lateral reaming faces and all of said reaming faces being substantially covered with abrading elements, said bit body having a longitudinally extending opening formed therethrough providing flow communication from said hollow member through said lower face, said lower face having an axial recess and a slot extending radially from said recess the full width and height thereof through a side of said bit body.*

*23. A drill bit adapted to be attached to a drill stem for the drilling of holes in earth formations, said drill bit comprising a hollow shank and an enlarged bit body attached to the lower end thereof and having a generally triangular configuration defined by co-axial segmental cylindrical lateral reaming faces and by intermediate non-reaming lateral facets each of greater circumferential extent than any of said reaming faces and each lying wholly within the cylinder generated by said reaming faces, said drill*

*bit having a lower rounded reaming surface provided with an axial recess, there being a hole through said bit body establishing flow communication from said hollow shank to said lower surface and to said recess, and said bit body having a slot extending from said recess the full height and width of said recess and opening through one of said lateral non-reaming facets, said reaming faces, said lower reaming surface, and the surface of said recess being set with abrading elements.*

*24. A drill bit adapted to be attached to a drill stem for the drilling of holes in earth formations, said drill bit comprising a hollow shank, an enlarged bit body carried by said shank and having a lower surface of generally triangular configuration defined by three coaxial segmental cylindrical lateral reaming faces and by three non-reaming lateral facets, each of said facets being of greater circumferential extent than each of said faces and lying circumferentially between two of said faces, and diametrically opposite the third of said faces, and each of said facets lying wholly within the cylindrical surface generated by said reaming faces, said drill bit having a hole extending from said hollow shank through said lower surface, and said lower surface and lateral reaming faces being set with abrading elements.*

References Cited in the file of this patent or the original patent

UNITED STATES PATENTS

| | | |
|---|---|---|
| 62,003 | Case | Feb. 12, 1867 |
| 671,429 | Bacon | Apr. 9, 1901 |
| 2,116,898 | Johnson | May 10, 1938 |
| 2,264,617 | Carpenter | Dec. 2, 1941 |
| 2,283,510 | Potter | May 19, 1942 |
| 2,371,490 | Williams | Mar. 13, 1945 |
| 2,381,415 | Williams | Aug. 7, 1945 |
| 2,497,144 | Stone | Feb. 14, 1950 |
| 2,607,562 | Phipps | Aug. 19, 1952 |
| 2,612,348 | Catallo | Sept. 30, 1952 |
| 2,614,809 | Zublin | Oct. 21, 1952 |
| 2,838,284 | Austin | June 10, 1958 |